July 20, 1954  L. C. ROTH  2,684,034
LIQUID COOLING STRUCTURE FOR PUMP SHAFTS
Filed May 12, 1951  2 Sheets-Sheet 1
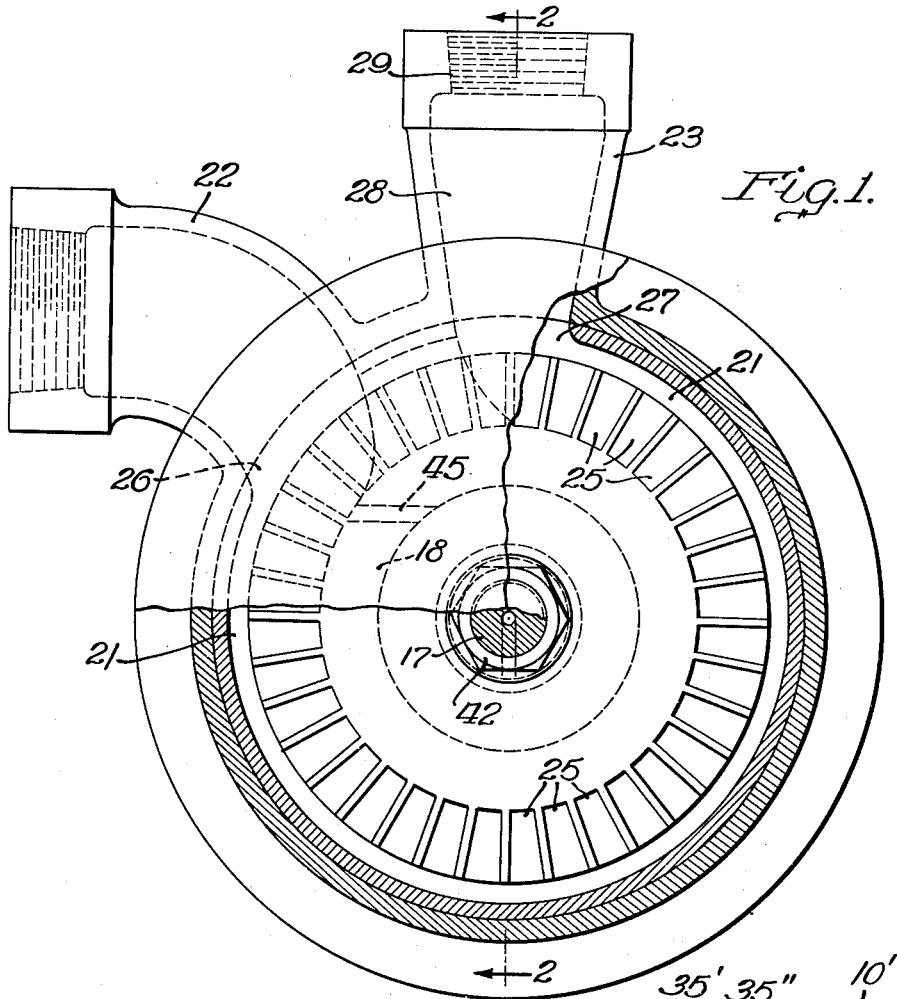
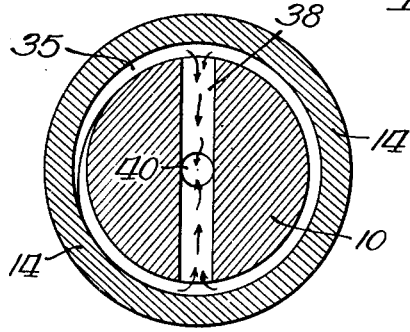
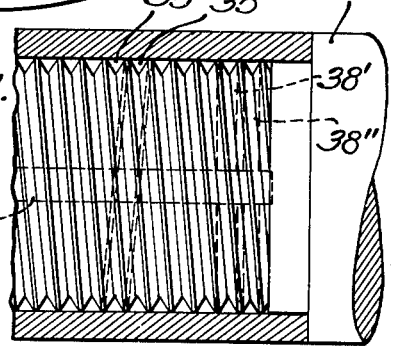
INVENTOR.
Leo C. Roth
BY
*Brown, Jackson, Boettcher & Dienner*
Attys.

July 20, 1954  L. C. ROTH  2,684,034
LIQUID COOLING STRUCTURE FOR PUMP SHAFTS
Filed May 12, 1951  2 Sheets-Sheet 2

INVENTOR.
Leo C. Roth
BY

Patented July 20, 1954

2,684,034

UNITED STATES PATENT OFFICE 2,684,034

LIQUID COOLING STRUCTURE FOR PUMP SHAFTS

Leo C. Roth, Moline, Ill., assignor to Roy E. Roth Company, Rock Island, Ill., a corporation of Illinois Application May 12, 1951, Serial No. 225,942

11 Claims. (Cl. 103—111)

This invention relates, in general, to improvements in pumps, and has particular relation to an improved liquid cooling structure for pump shafts.

While the particular embodiment of the invention which I shall describe hereinafter in connection with the drawings shows the improved liquid-cooling structure applied to the shaft of a typical turbine type pump, it is to be understood that the present invention is not limited to this particular use but may be used to equal advantage in centrifugal pumps and in other types of pumps.

One of the features that is common to practically all types of pumps is the stuffing box (i. e., the device which is used to seal off liquid leakage at the place in the pump where the rotating shaft enters the stationary casing). Stuffing boxes are, for a variety of reasons, troublesome; the chief reason being that considerable heat is generated by the shaft rotating in the packing. The higher the shaft speed, the higher the liquid pressure that must be sealed off, and the poorer the liquid is in its lubricating qualities, the more trouble which is encountered with the stuffing box.

Many attempts have been made to reduce or eliminate or dissipate the heat so generated in the stuffing box. There are water and liquid cooled stuffing boxes. There are stuffing boxes equipped with lubricating devices, called lantern rings, which enable a lubricant to be delivered to the shaft in somewhat the same fashion as oil to a sleeve bearing. There are also all sorts of packings with built-in lubrication; usually flake graphite. However, none of these devices has been entirely successful in all troublesome applications because they cannot dissipate the heat rapidly from the point at which it is generated, which is the surface of the shaft in contact with the packing.

For pumps for corrosive liquids, it has previously been proposed, where the liquid is corrosive when warm but not undesirably corrosive in cold condition, to take out some of the liquid from the pressure side of the pump to an external cooling device where it is cooled and then to pass the liquid in cold condition to the shaft. Where the liquid is corrosive in cold state as well as when warm, it has been proposed to take out some of the liquid from the pressure side of the pump to an external cylinder where it is applied to a piston to pass a different liquid in around the shaft. These schemes thus intend to cool the pumped liquid before circulating it to the shaft or to provide a liquid from an outside source in each case for a purpose which is different from that of the present invention. Moreover, such schemes involve exterior piping and external cooling or pressure devices.

One of the main objects of the present invention is to provide an improved cooling structure for dissipating as rapidly as it is generated the heat created by friction between the rotating shaft and the stationary packing in the stuffing box of the pump.

Another object of the invention is to provide a cooling structure for using the pumped liquid as the cooling medium and which is of a character to circulate some of the pumped liquid directly through and/or around the shaft by means of internal passages and without external conduits, piping, packings, or external cooling or pressure devices.

Another object of the invention is to provide an improved cooling structure for keeping the pump shaft at approximately the same temperature as that of the pumped liquid and which utilizes the pressure differential which already exists or is created within the pump to cause the liquid to flow for the specific purpose of cooling the shaft.

Another and more specific object of the invention is to create within the pump the pressure differential to cause the liquid flow for cooling the shaft by the simple expedient of a by-pass groove between the suction of the pump and one of the two chambers disposed within the sealing surfaces of the pump and on opposite sides of the impeller.

Further features and advantages and other adaptations of the invention will be apparent from the following detailed description and the accompanying drawings.

In the drawings:

Figure 1 is a side elevation of a pump embodying the present invention with a portion broken away and in section;

Figure 3 is a detail transverse section through the shaft and the surrounding sleeve, taken on the line 3—3 of Figure 2; and Figure 4 is a fragmentary detail view partially in elevation and partially in section showing a plural spiral channel inside the shaft sleeve through which the cooling liquid is circulated.

Figure 2:
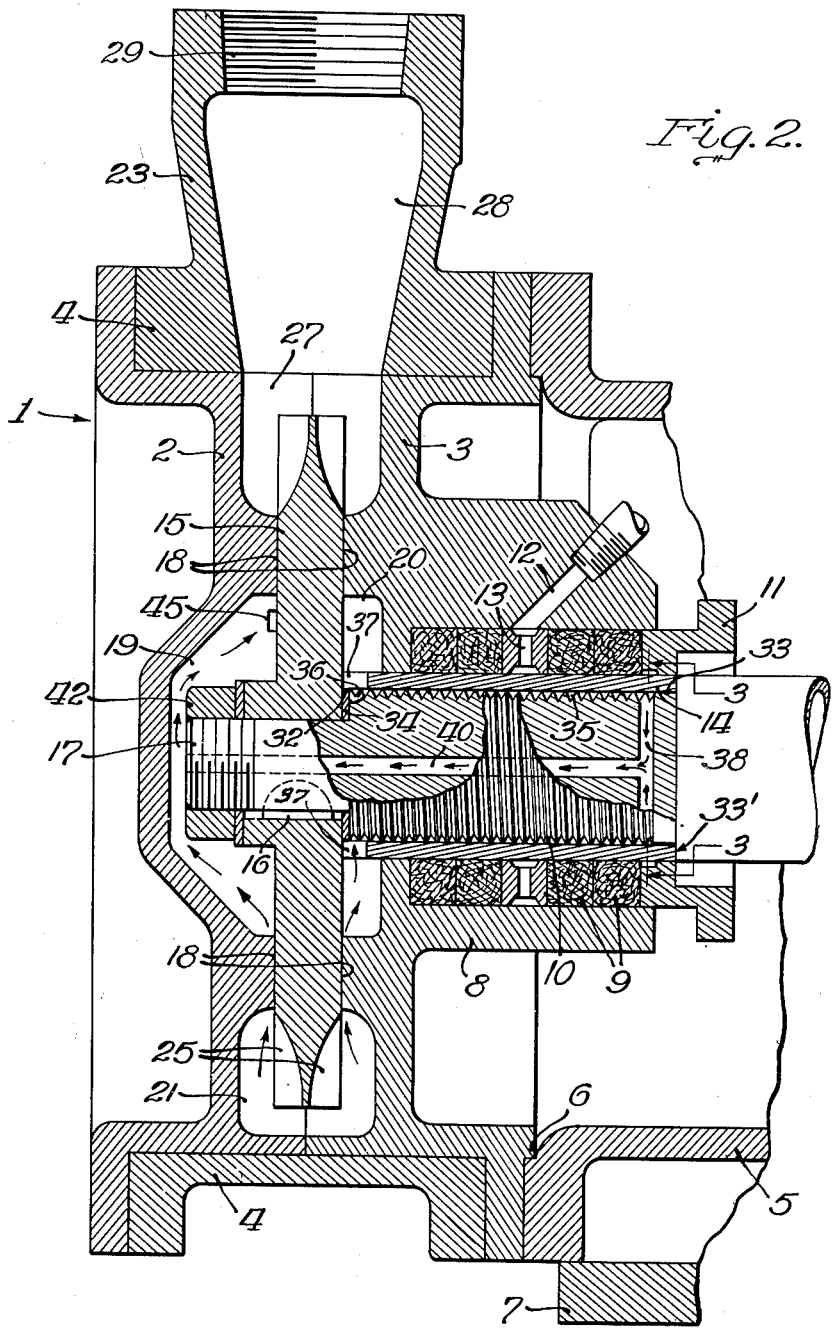
Figure 2 is a section taken on the line 2—2 of Figure 1.

With reference now to the drawings, the particular pump selected for illustration is a turbine type pump, but this is not to be construed as limiting the scope of the invention to this type of pump only.

The illustrated pump comprises a pump casing indicated in its entirety at 1 and formed of two contiguous sides or casing parts 2 and 3. The abutting contiguous edges of the parts 2 and 3 are surrounded by a sealing ring 4. A casing extension 5 may telescopically engage over a short annular flange 6 on the part 3, and the extension 5 may, if desired, be provided with a supporting base 7. The casing parts are clamped together, for example, by suitable bolts (not shown).

The casing part 3 has an outwardly extending tubular boss 8 forming a stuffing box in which suitable stationary packing 9 is disposed for sealing the pump against liquid leakage at the place where the rotating pump shaft 10 enters the interior of the stationary pump casing. A suitable gland member is provided at 11 as well known in the art, and there is a lubricating duct at 12 through which suitable lubricant may be introduced to the packing 9, or through a communicating duct 13 extending through the packing to the surface of a sleeve 14 which rotates within the packing 9.

An impeller 15 is mounted for rotation within the pump casing and is fixed, for example, by a key or spline 16 on the inner end 17 of the pump shaft 10 which projects through the impeller 15 at the axis thereof. The casing parts 2 and 3 have opposed generally annular ribs or flanges 18 on their inner surfaces which abut or cooperate with the opposite sides of the web of the impeller 15 to form sealing surfaces which define a pair of chambers 19 and 20 on opposite sides of the impeller and a pressure developing passageway or channel 21 outwardly of the chambers 19 and 20. The pump casing has a liquid inlet projection 22 which extends generally tangentially with respect to the casing, and a liquid outlet projection 23 which extends generally radially from the casing. The pressure developing passageway 21 extends generally circumferentially about the periphery of the impeller from the pump inlet 22 to the pump outlet 23.

The impeller 15 has at its outer periphery two sets of blades or vanes 25. One set of these vanes 25 opens from one side of the outer marginal portion of the impeller, and the other set of vanes opens from the other side of the outer marginal portion of the impeller. Both sets of vanes 25 open radially from the outer periphery of the impeller, and both sets of vanes operate within the pressure developing passageway 21. It is to be understood that the particular form and disposition of the blades or vanes of the impeller may vary widely in so far as the present invention is concerned.

The interior of the inlet projection 22 opens into the inlet or suction end of the passageway 21 through an opening 26 within the pump casing. An outlet 27 opens from the outlet end of the passageway 21 into a receiving or separating chamber 28 in the outlet projection 23. The chamber 28 has an outlet or discharge opening 29 through which the liquid is delivered from the pump.

The sleeve 14, which rotates within the packing 9, is supported on its inside diameter by two shoulders 32 and 33. The shoulder 33 may, for example, be turned on and integral with the shaft 10. The other shoulder 32 may be formed by a ring 34 which may be slipped into place over the reduced inner projecting end 17 of the shaft and clamped between the impeller 15 and the shoulder formed by the adjacent larger diameter portion of the shaft 10. If desired, the shoulder 32 may be turned on the adjacent side of the impeller 15, or formed otherwise as desired.

The larger diameter portion of the shaft 10 outwardly of the inner reduced end 17 has a spiral groove 35 similar to a screw thread cut in its outer periphery. One end of this spiral groove 35 terminates adjacent to the impeller 15 and communicates at this end with one of the chambers 19, 20 (i. e., in the illustrated embodiment of the invention with the chamber 20) through two diametrically opposite slots 37 cut into the end of the sleeve 14 which abuts the impeller 15 and two mating slots 36 cut into the shoulder at the adjacent end of the adjacent portion of the shaft 10 underneath the slots 37. The opposite end of the groove 35 terminates adjacent to the shoulder 33 and in communication with the outer ends of a hole or aperture 38 which is drilled transversely through the shaft 10. A hole or opening 40 is drilled from the inner end of the shaft 10 and through the shaft axially thereof to a point where it communicates with the transverse hole 38.

From the foregoing it will now be apparent that slots 36, mating slots 37, spiral groove 35, transverse hole 38, and axial hole 40 constitute portions of a cooling channel which communicates at one end with the chamber 20 on one side of the impeller 15 and at its opposite end with the chamber 19 on the other side of the impeller. The spiral channel portion formed by the spiral groove 35 is disposed between the reduced diameter portion of the shaft 10 and the sleeve 14, and the holes 38 and 40 extend through the shaft.

In the particular structure selected for illustration, the sleeve 14 is held in place by the shaft nut 42 which is screwed upon the inner end of the reduced inner projecting end 17 of the shaft and clamps the impeller 15 against the inner end of the sleeve 14, and the outer end of the sleeve 14 against the shoulder 33'. The sleeve 14 may in this manner be clamped for rotation with the impeller 15 and shaft 10, or it may be secured for rotation with the shaft and within the stationary packing 9 in any other suitable manner.

If desired, instead of using a single spiral groove in the outer periphery of the shaft 10, a plural spiral groove may be employed. In Figure 4 a double spiral groove 35', 35'' is employed, and in this case there are two transverse holes 38', 38'' opening transversely through the shaft 10', one hole for each of the spiral grooves 35', 35''. Both holes 38' and 38'' communicate with the outer end of the axial hole 40'. This is illustrative of a plural groove arrangement, but it will be understood that triple or any other desired number of spiral grooves may be employed with a corresponding number of transverse holes, one for each spiral groove.

It is contemplated within the scope of the broader aspects of the invention that instead of applying a spiral groove 35, or a plurality of spiral grooves, there may be merely an annular space between the sleeve 14 and the shaft 10 to provide this portion of the cooling channel. By means of the one or more spiral grooves it has been found, however, that the cooling channel may be kept as uniform as desired to prevent precipitation of solids out of the liquid being pumped, which may be encountered where the liquid velocity is reduced on entering a relatively large space between the sleeve 14 and the shaft 10.

Where one or more spiral grooves are employed as in the preferred embodiment of the invention, it is further contemplated to cut these grooves in the inner periphery of the sleeve 14 instead of in the outer periphery of the shaft 10 as shown in the drawing.

As a partial means for producing a pressure differential in the chambers 19 and 20 on opposite sides of the impeller 15, a by-pass groove 45 is formed across the sealing surface 18 on one side of the impeller (preferably on the side shown in the drawing). The groove 45 extends between the chamber 19 and the suction of the pump, and thereby places the chamber 19 in communication with pump suction.

In the operation of the pump, some of the liquid under pressure in the pressure developing channel 21 will by-pass inwardly along the sealing surfaces at 18 in approximately equal quantities to the chambers 19 and 20 on opposite sides of the impeller 15 as shown by the arrows in Figure 2. Since the liquid on the side of the impeller where the by-pass groove 45 is placed has easier egress to the suction of the pump (which is the lowest pressure area within the pump), there will be a higher pressure on the side of the impeller adjacent to the packing 9. This causes some of the liquid which is being by-passed to flow, as indicated by the arrows in Figure 2, from the chamber 20 through the slots 37 and 36, the one or more transverse holes 38, and through axial hole 40 into the chamber 19 on the opposite side of the impeller, from where this liquid flows through the groove 45 to the suction of the pump.

The pumped liquid, which is circulated as above described, thus serves as a cooling medium for dissipating heat created by friction between the rotating shaft and the stationary packing in the stuffing box of the pump. In this way the pump shaft may be kept at substantially the same temperature as that of the pumped liquid.

The use of the present invention is not restricted to a pump for handling a particular liquid or particular class of liquids, but is equally applicable to any liquid that can be pumped. Moreover, as previously indicated, the invention is not restricted to a turbine type pump, but may be used to equal advantage in centrifugal pumps and other types of pumps.

The embodiments of the invention shown in the drawings are for illustrative purposes only, and it is to be expressly understood that said drawings and the accompanying specification are not to be construed as a definition of the limits or scope of the invention, reference being had to the appended claims for that purpose.

I claim:

1. In a liquid pump of the class wherein there is a packing within a stuffing box, a pump shaft which rotates within said packing and a pump casing having an impeller therein and provided with sealing surfaces defining a pair of chambers disposed on opposite sides of the impeller and a pressure developing passageway outwardly of said chambers from which some of the pumped liquid is adapted to flow into said chambers along the sealing surfaces, the combination with said pump of a cooling channel extending along the pump shaft, said channel communicating at one end with one of the chambers on opposite sides of the impeller and communicating at its opposite end with the other chamber, and means defining a by-pass groove between the suction of the pump and one of said chambers for creating a pressure differential to cause some of the pumped liquid to flow from one of said chambers through the cooling channel along the shaft and to the other chamber.

2. A pump according to claim 1 wherein the cooling channel extending along the pump shaft comprises a first channel portion extending between the shaft and the packing with one end in communication with one of the chambers on opposite sides of the impeller and with the opposite end of said first channel portion in communication with a second channel portion extending through the pump shaft into communication with the other chamber.

3. A pump according to claim 1 wherein the cooling channel extending along the pump shaft comprises a first channel portion of spiral form extending spirally between the shaft and the packing, with one end in communication with one of the chambers on opposite sides of the impeller and with the opposite end of said first channel portion in communication with a second channel portion extending axially through the pump shaft into communication with the other chamber.

4. A pump according to claim 1 wherein the portion of the pump shaft which rotates within the packing is of reduced diameter and has a surrounding sleeve disposed between it and the packing with the ends of the sleeve abutting against the impeller and a shoulder on the shaft, the cooling channel extending along the shaft being disposed between the reduced diameter portion of the shaft and the sleeve.

5. A pump according to claim 1 wherein the portion of the pump shaft which rotates within the packing is of reduced diameter and has a surrounding sleeve disposed between it and the packing with the ends of the sleeve abutting against the impeller and a shoulder on the shaft, the cooling channel extending along the shaft comprising a first channel portion disposed between the reduced diameter portion of the shaft and the sleeve with one end in communication with one of the chambers on opposite sides of the impeller and with the opposite end of said first channel portion in communication with a second channel portion extending through the pump shaft into communication with the other chamber.

6. A pump according to claim 1 wherein the portion of the pump shaft which rotates within the packing is of reduced diameter and has a surrounding sleeve disposed between it and the packing with the ends of the sleeve abutting against the impeller and a shoulder on the shaft, the cooling channel extending along the shaft comprising a first channel portion of spiral form extending spirally between the reduced diameter portion of the shaft and the sleeve with one end in communication with one of the chambers on opposite sides of the impeller and the opposite end of said first channel portion in communication with a second channel portion extending axially through the pump shaft into communication with the other chamber.

7. A pump according to claim 1 wherein the portion of the pump shaft which rotates within the packing is of reduced diameter and has a surrounding sleeve disposed between it and the packing with the ends of the sleeve abutting against the impeller and a shoulder on the shaft, the cooling channel extending along the shaft comprising a first channel portion of plural spiral form extending spirally between the reduced diameter portion of the shaft and the sleeve with one end in communication with one of the chambers on opposite sides of the impeller and with the opposite end of said first channel portion in communication with a second channel portion extending axially through the pump shaft into communication with the other chamber.

8. A pump according to claim 1 wherein the portion of the pump shaft which rotates within the packing is of reduced diameter and has a surrounding sleeve disposed between it and the packing with the ends of the sleeve abutting against the impeller and a shoulder on the shaft, the cooling channel extending along the shaft being disposed between the reduced diameter portion of the shaft and the sleeve, the shaft having a portion projecting axially through the impeller, and a nut screwed on the projecting end of the shaft and clamping the impeller against one end of the sleeve and the opposite end of the sleeve against the shoulder on the shaft.

9. A pump according to claim 1 wherein the portion of the pump shaft which rotates within the packing is of reduced diameter and has a surrounding sleeve disposed between it and the packing with the ends of the sleeve abutting against the impeller and a shoulder on the shaft, the cooling channel extending along the shaft being disposed between the reduced diameter portion of the shaft and the sleeve.

10. In a liquid pump of the class described, in combination, a packing within a stuffing box, a pump shaft which rotates within said packing, a pump casing having an impeller therein and provided with sealing surfaces which cooperate with opposite sides of said impeller to define a pair of chambers disposed on opposite sides of said impeller and a pressure developing passageway outwardly of said chambers from which some of the pumped liquid is adapted to flow into said chambers along said sealing surfaces, means defining a cooling channel extending along the pump shaft, said channel communicating at one end with one of said chambers on opposite sides of said impeller and communicating at its opposite end with the other chamber, and means effective to create a pressure differential in said chambers on opposite sides of said impeller to cause some of the pumped liquid to flow from one of said chambers through said cooling channel along the shaft and to the other chamber.

11. A pump according to claim 10 wherein the cooling channel comprises a first cooling channel portion extending longitudinally through the pump shaft and communicating at one end with one of said chambers on opposite side of said impeller, a second cooling channel portion extending along the exterior of said pump shaft and communicating at one end with the other of said chambers on opposite sides of said impeller, and a third cooling channel portion extending transversely through said pump shaft and placing said first and second channel portions in communication.

References Cited in the file of this patent

UNITED STATES PATENTS

| Number | Name | Date |
|---|---|---|
| 879,484 | Morterud | Feb. 18, 1908 |
| 1,931,724 | Fageol | Oct. 24, 1933 |
| 2,010,525 | McHugh | Aug. 6, 1935 |
| 2,233,268 | McHigh | Feb. 25, 1941 |
| 2,632,395 | Jennings et al. | Mar. 24, 1953 |

FOREIGN PATENTS

| Number | Country | Date |
|---|---|---|
| 60,249 | Sweden | Dec. 16, 1920 |
| 475,253 | Germany | Nov. 2, 1927 |